(12) United States Patent
Chou (10) Patent No.: US 10,444,418 B2
(45) Date of Patent: Oct. 15, 2019

(54) MOUSE PAD HAVING MULTIPLE LIGHT GUIDE PLATES

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 15 days.

(21) Appl. No.: 15/659,590

(22) Filed: Jul. 25, 2017

(65) Prior Publication Data
US 2018/0239073 A1 Aug. 23, 2018

(30) Foreign Application Priority Data
Feb. 21, 2017 (TW) .............................. 106202516 U (51) Int. Cl.
G02B 6/00 (2006.01)
F21V 8/00 (2006.01)
G06F 3/039 (2013.01)
B29D 11/00 (2006.01)

(52) U.S. Cl.
CPC ...... *G02B 6/0008* (2013.01); *B29D 11/00663* (2013.01); *G02B 6/005* (2013.01); *G02B 6/0021* (2013.01); *G02B 6/0028* (2013.01); *G02B 6/0031* (2013.01); *G02B 6/0078* (2013.01); *G02B 6/0088* (2013.01); *G06F 3/0395* (2013.01)

(58) Field of Classification Search
CPC ...... G02B 6/0055; G02B 6/0031; G02B 6/00; G06F 3/0395
See application file for complete search history.

(56) References Cited

U.S. PATENT DOCUMENTS

| | | | | |
|---|---|---|---|---|
| 6,339,418 B1 * | 1/2002 | Kitagawa | .............. | G02B 6/0071 345/102 |
| 6,530,670 B2 * | 3/2003 | Hirayama | ............ | G02B 6/0021 349/65 |
| 6,635,336 B1 * | 10/2003 | Chen | ...................... | G06F 3/0395 248/346.01 |
| 7,175,310 B1 * | 2/2007 | Cotterell | ............... | G06F 3/0395 362/253 |
| 8,651,720 B2 * | 2/2014 | Sherman | ................. | B44F 1/045 362/560 |
| 2002/0131270 A1 * | 9/2002 | Niemuth | ............. | F21V 33/0048 362/253 |

(Continued)

*Primary Examiner* — Christopher Stanford
(74) *Attorney, Agent, or Firm* — Chun-Ming Shih; HDLS IPR Services (57) ABSTRACT

A mouse pad having multiple light guide plates including a base, a plurality of light guide plates, a light reflection layer, at least one lateral light source module, a light unifying layer and a pad member is disclosed. The light guide plates are adjacently arranged and linearly extended in the base. The light reflection layer is disposed on a lateral surface of the light guide plates facing the base. The lateral light source module is disposed at one lateral side of the light guide plates. The light unifying layer is disposed on a lateral surface of the light guide plates away from the base. The pad member is disposed on an outer surface of the light unifying layer. The lateral light source module is able to emit lights to the pad member through the light guide plates and the light unifying layer for providing various lighting effects.

10 Claims, 6 Drawing Sheets

(56) References Cited

U.S. PATENT DOCUMENTS

| | | | |
|---|---|---|---|
| 2004/0224107 A1* | 11/2004 | Lewis | G06F 3/0395 428/34.1 |
| 2005/0052882 A1* | 3/2005 | Lath | G01V 8/10 362/551 |
| 2008/0030650 A1* | 2/2008 | Kitagawa | G02B 6/0068 349/65 |
| 2008/0225204 A1* | 9/2008 | Mishima | G02F 1/13452 349/65 |
| 2013/0058129 A1* | 3/2013 | Limber | G06F 1/3231 362/605 |

* cited by examiner

MOUSE PAD HAVING MULTIPLE LIGHT GUIDE PLATES

BACKGROUND OF THE INVENTION

Field of the Invention

The present invention relates to a mouse pad, especially to a mouse pad capable of illuminating lights.

Description of Related Art

Generally speaking, a mouse pad is used for enabling a mouse to be accurately displaced and allowing the displacement to be precisely sensed while the mouse is being operated by a user. Besides conventional soft or hard mouse pads available in the market, some mouse pads capable of illuminating lights are also available for providing various lighting effects, the lighting effects are mostly achieved by utilizing light emitting diodes (LEDs) or cold cathode fluorescent lamps (CCFLs) to be served as a light source, so that a better visual sensation can be provided to the user.

However, a conventional mouse pad capable of illuminating lights is to have a light source module mounted inside a pad member, so that the mouse pad capable of illuminating lights is unable to be rolled because of the installation of the light source module, and a problem is caused during storage. Moreover, single light guide unit is adopted in the light source of the conventional mouse pad capable of illuminating lights for achieving an illuminating effect in a large range, if a plurality of light sources are disposed for enhancing the illuminating effect, the light sources may interfere with each other, and a desired effect could not be achieved. Thus, the above-mentioned disadvantages shall be improved.

Accordingly, the applicant of the present invention has devoted himself for improving the mentioned disadvantages.

SUMMARY OF THE INVENTION

The present invention is to provide a mouse pad having multiple light guide plates, in which lights emitted by a light emitting unit can be defined as an independent light source and the lights can travel in a corresponding light guide plate, thereby enhancing the lighting effect of the mouse pad.

The present invention is to provide a mouse pad having multiple light guide plates, in which light guide plates are adjacently arranged and linearly extended, so that the mouse pad can be rolled for storage and an advantage of convenient in use is provided.

Accordingly, the present invention provides a mouse pad having multiple light guide plates, which includes a base, a plurality of light guide plates, a light reflection layer, at least one lateral light source module, a light unifying layer and a pad member. The base includes an accommodation space and an electric wire. The light guide plates are adjacently arranged and linearly extended in the accommodation space. The light reflection layer is disposed on a lateral surface of the light guide plates facing the base. The lateral light source module is disposed at one lateral side of the light guide plates, and includes a flexible wire and a plurality of light emitting units. The flexible wire is electrically connected to the electric wire. The light emitting units are disposed on the flexible wire and electrically connected to the flexible wire. The light unifying layer is disposed on a lateral surface of the light guide plates away from the base. The pad member is disposed on an outer surface of the light unifying layer. The light emitting units are able to emit lights to the pad member through the light guide plates and the light unifying layer.

In comparison with related art, the present invention has advantageous features as follows. According to the present invention, the plural light guide plates are adjacently arranged and linearly extended, and the lateral light source module is disposed at one lateral side of the light guide plates, so that lights emitted by the light emitting units can be defined as an independent light source and the lights can travel in the corresponding light guide plate, thereby allowing the light emitting units to provide various lighting effects; moreover, because the mouse pad of the present invention includes the plural light guide plates which are adjacently arranged and linearly extended, the mouse pad can be rolled for storage and an advantage of convenient in use is provided

DETAILED DESCRIPTION OF THE INVENTION

A preferred embodiment of the present invention will be described with reference to the drawings.

Figure 1:
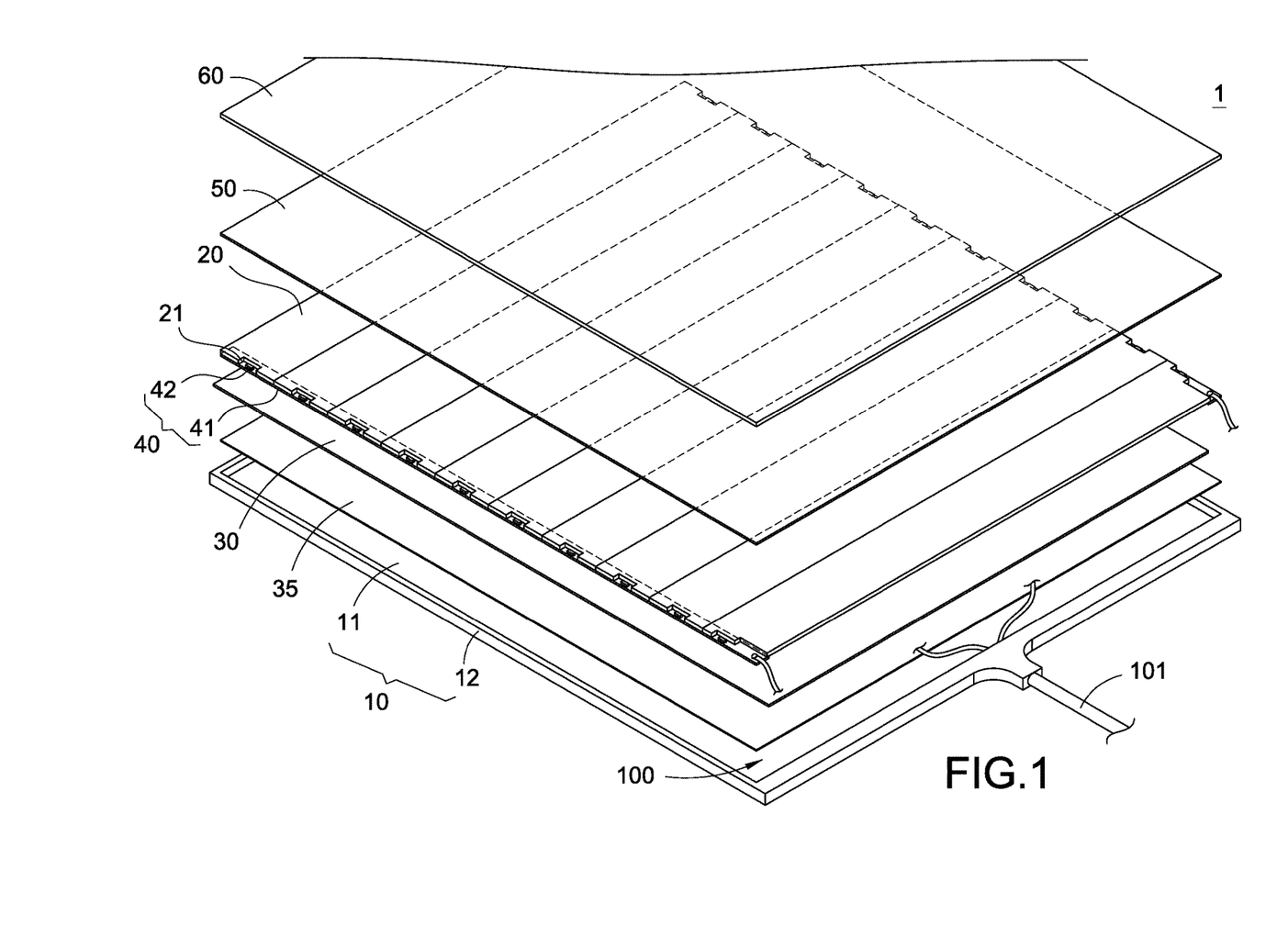
FIG. 1 is a perspective exploded view showing a mouse pad having multiple light guide plates according to the present invention.
Figure 2:
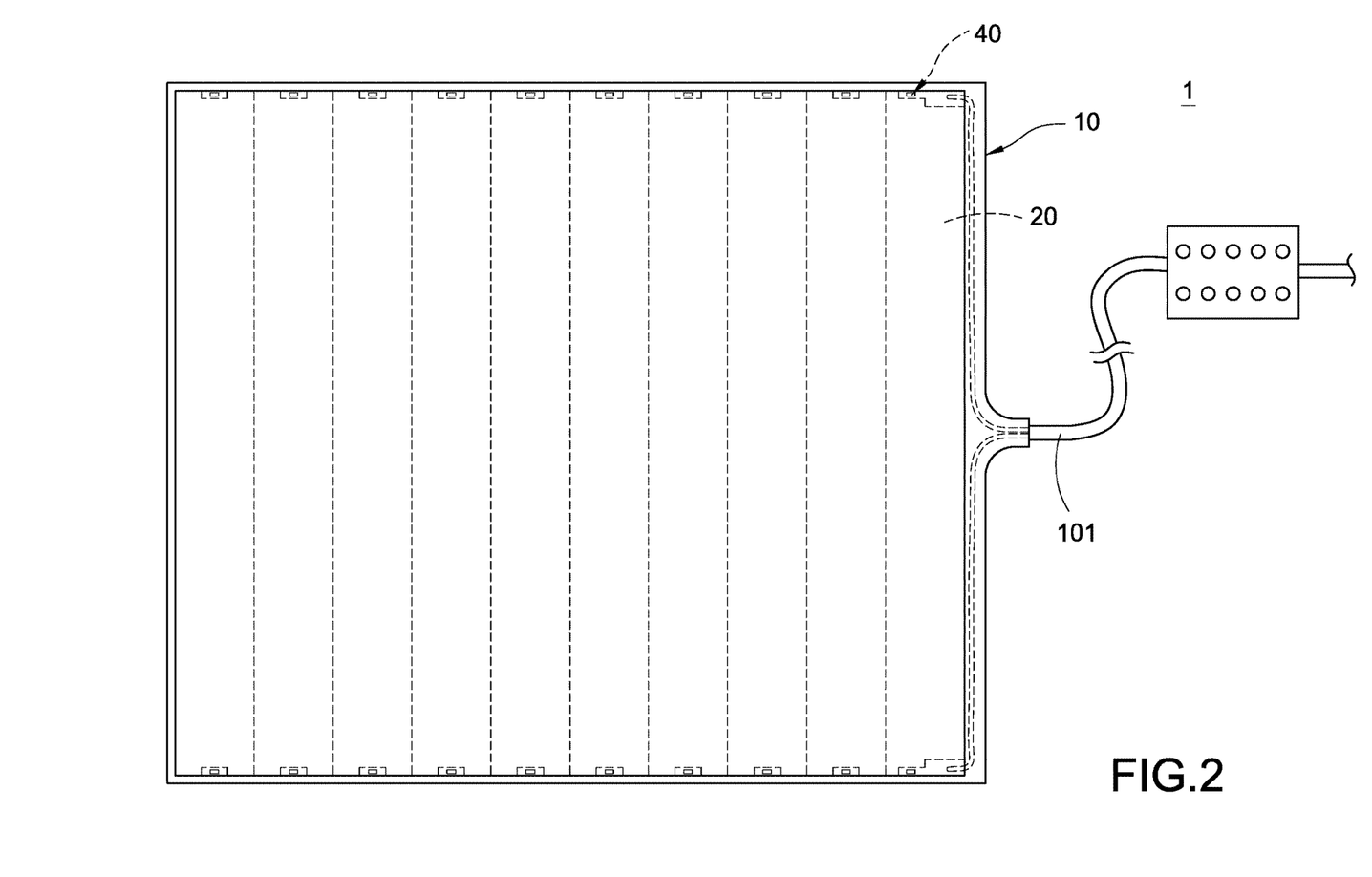
FIG. 2 is a top view showing the assembly of the mouse pad having multiple light guide plates according to the present invention.

Please refer to FIG. 1 and FIG. 2, wherein FIG. 1 is a perspective exploded view showing a mouse pad having multiple light guide plates according to the present invention; and FIG. 2 is a top view showing the assembly of the mouse pad having multiple light guide plates according to the present invention. As shown in FIG. 1, the present invention provides a mouse pad having multiple light guide plates 1, which includes a base 10, a plurality of light guide plates 20, a light reflection layer 30, at least one lateral light source module 40, a light unifying layer 50 and a pad member 60. The pad member 60, the light unifying layer 50, the light reflection layer 30 and the light guide plates 20 are sequentially disposed on the base 10 with a top/down manner. The lateral light source module 40 is disposed at one side of the light guide plates 20 so as to provide a light source on a lateral surface of the base 10, and the light guide plates 20 are served to guide the light source arranged at one lateral side.

The base 10 includes an accommodation space 100 and an electric wire 101. According to one embodiment of the present invention, the base 10 includes a bottom plate 11 and a plurality of lateral sheets 12, and the lateral sheets 12 are served to surround the periphery of the bottom plate 11 thereby defining the accommodation space 100.

The light guide plates 20 are made of a light guide material, for example silicon, rubber, plastic or glass. The light guide plates 20 are adjacently arranged and linearly extended in the accommodation space 100.

The light reflection layer 30 is disposed on a lateral surface of the light guide plates 20 facing the base 10; in other words the light reflection layer 30 is disposed at a bottom side of the light guide plates 20. Accordingly, when lights are emitted to the bottom side of the light guide plates 20, the light reflection layer 30 can be used for reflecting the lights for providing a light reflection effect, thereby increasing an illuminating effect.

Preferably, the mouse pad 1 further includes an anti-skid pad 35. The anti-skid pad 35 is preferably to be disposed between the base 10 and the light reflection layer 30, so that an anti-skid effect can be provided between the base 10 and the light reflection layer 30 for enabling the light reflection layer 30 to be positioned on the base 10.

What shall be addressed is that, in actual practice, the light reflection layer 30 can be detachably disposed at the bottom side of the light guide plates 20, or the light reflection layer 30 can be directly formed on a lateral surface of the anti-skid pad 35 facing the light guide plates 20.

The lateral light source module 40 is disposed at one lateral side of the light guide plates 20. The lateral light source module 40 includes a flexible wire 41 and a plurality of light emitting units 42. The flexible wire 41 is electrically connected to the electric wire 101, and the light emitting units 42 are disposed on the flexible wire 41 and electrically connected to the flexible wire 41.

According to one embodiment of the present invention, there is a plurality of the lateral light source modules 40, two opposite sides of the light guide plates 20 are respectively disposed with one of the lateral light source modules 40. Preferably, the amount of the light emitting units 42 is corresponding to the amount of the light guide plates 20.

The light unifying layer 50 is disposed on a lateral surface of the light guide plates 20 away from the base 10. The pad member 60 is formed as a planar sheet member, and made of a light-pervious material. The pad member 60 is disposed on an outer surface (defined as being away from the light guide plates 20) of the light unifying layer 50, so that the light emitting units 42 are able to emit lights to the pad member 60 through the light guide plates 20 and the light unifying layer 50.

Figure 3:
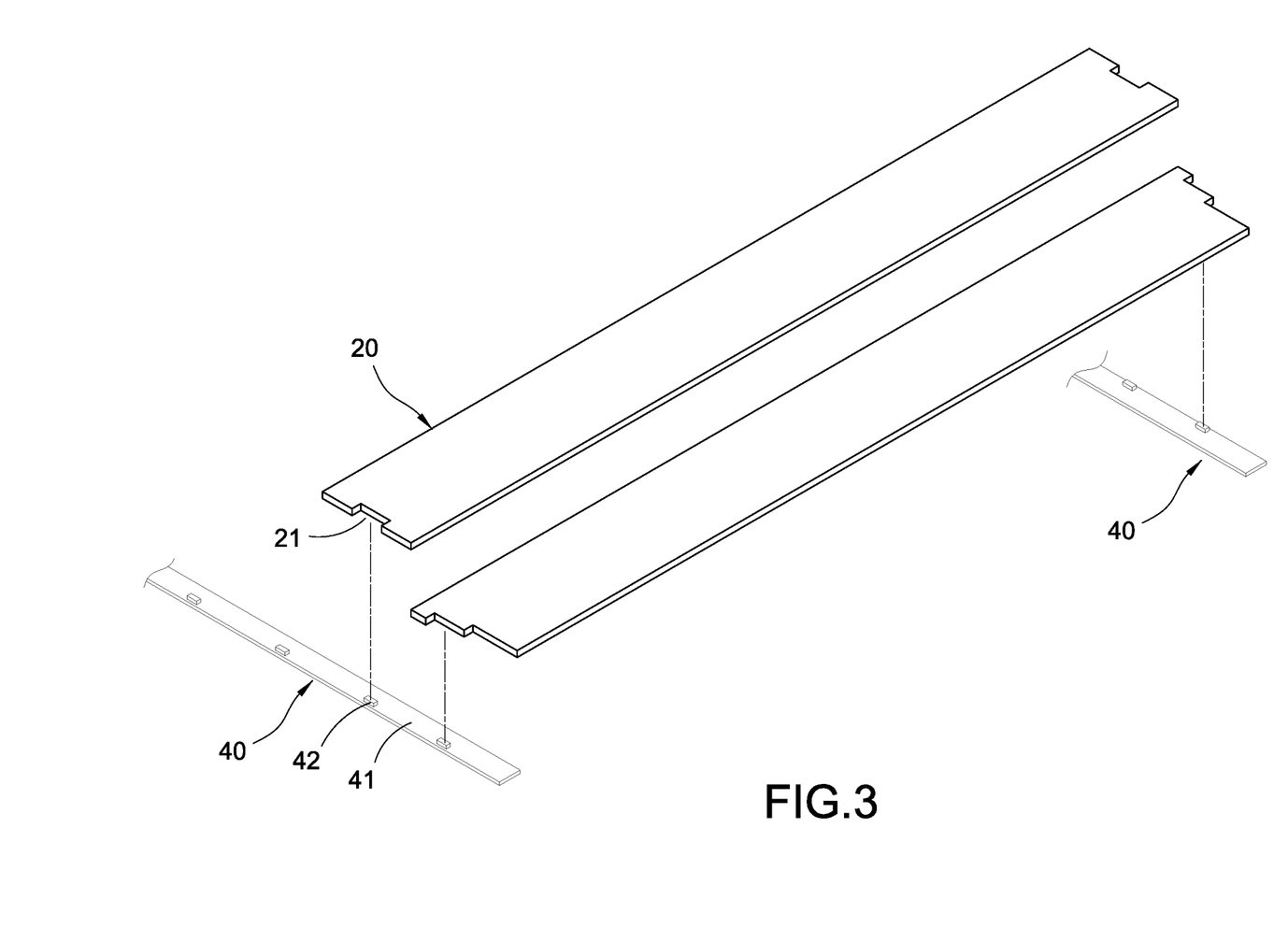
FIG. 3 is a perspective exploded view showing the light guide plates and the lateral light source modules according to the present invention.

Please refer to FIG. 3, which is a perspective exploded view showing the light guide plates and the lateral light source modules according to the present invention. As shown in FIG. 3, according to one embodiment of the present invention, one side of the light guide plates 20 is respectively formed with a hollow slot 21; and the flexible wire 41 of the lateral light source module 40 is disposed on a bottom surface defined at one side of the light guide plate 20, and the light emitting unit 42 is exposed in the hollow slot 21. Accordingly, the light emitting unit 42 is able to be disposed on a lateral surface of the light guide plate 20 and not protruded to exceed the height of the light guide plate 20, so that the light unifying layer 50 is allowed to be disposed above the light guide plates 20.

Figure 4:
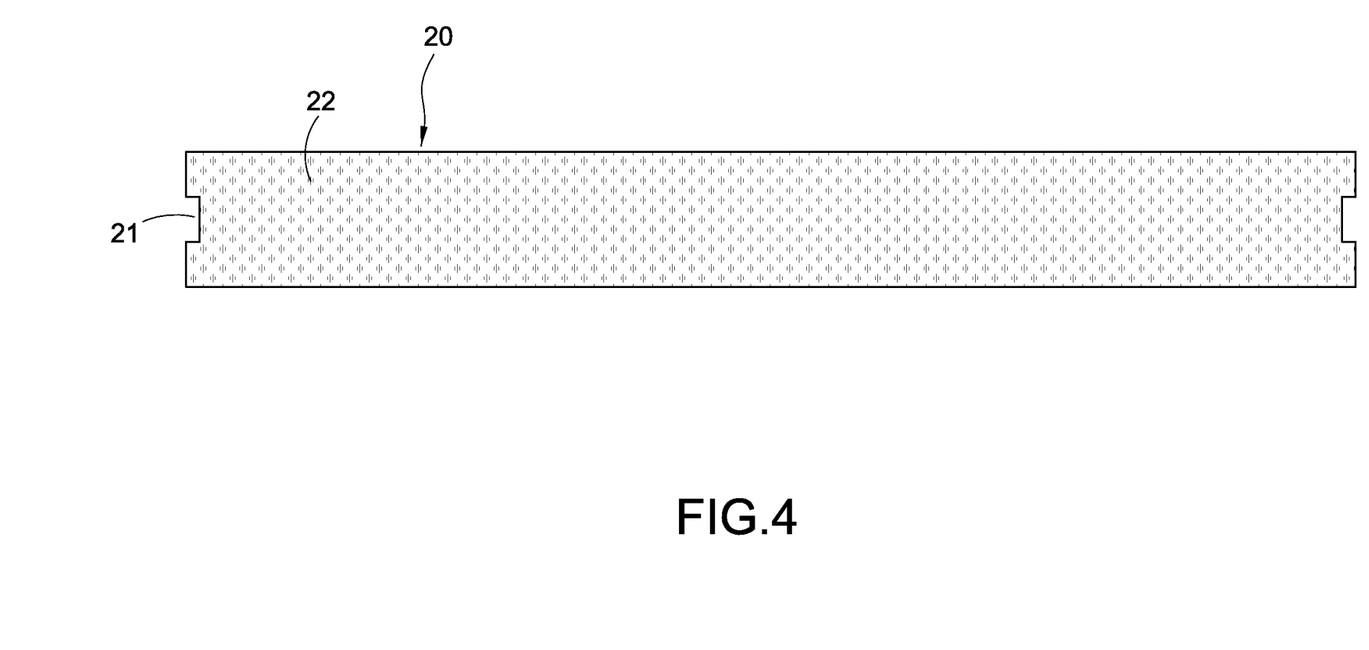
FIG. 4 is a top view showing the light guide plate according to the present invention.

Please refer to FIG. 4, which is a top view showing the light guide plate according to the present invention. What shall be addressed is that, according to this embodiment, the light guide plate 20 has a plurality of light guide structures 22; the light guide structures 22 are able to increase the light guide effect of the light guide plate 20, so that the lighting efficiency of the light emitting unit 42 can be increased.

Figure 5:
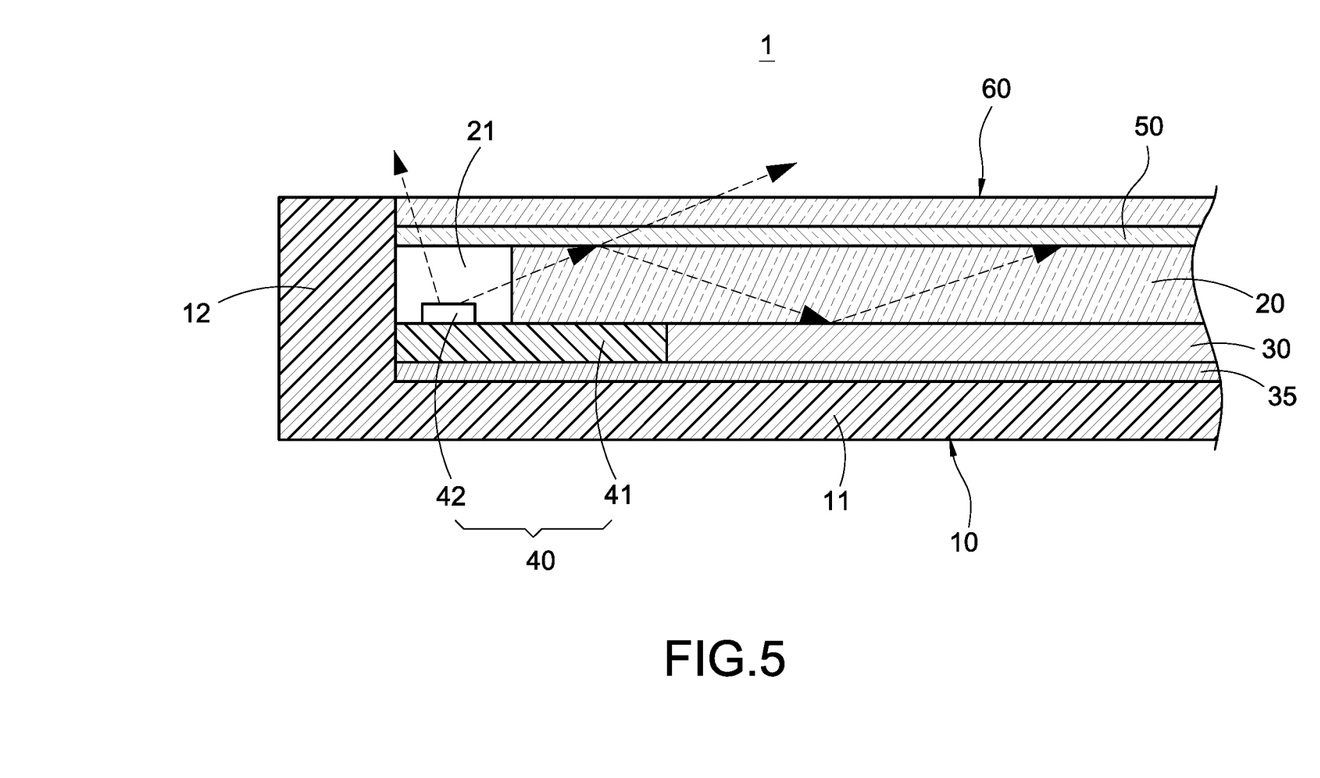
FIG. 5 is schematic view showing the mouse pad illuminating lights from one lateral side according to the present invention.
Figure 6:
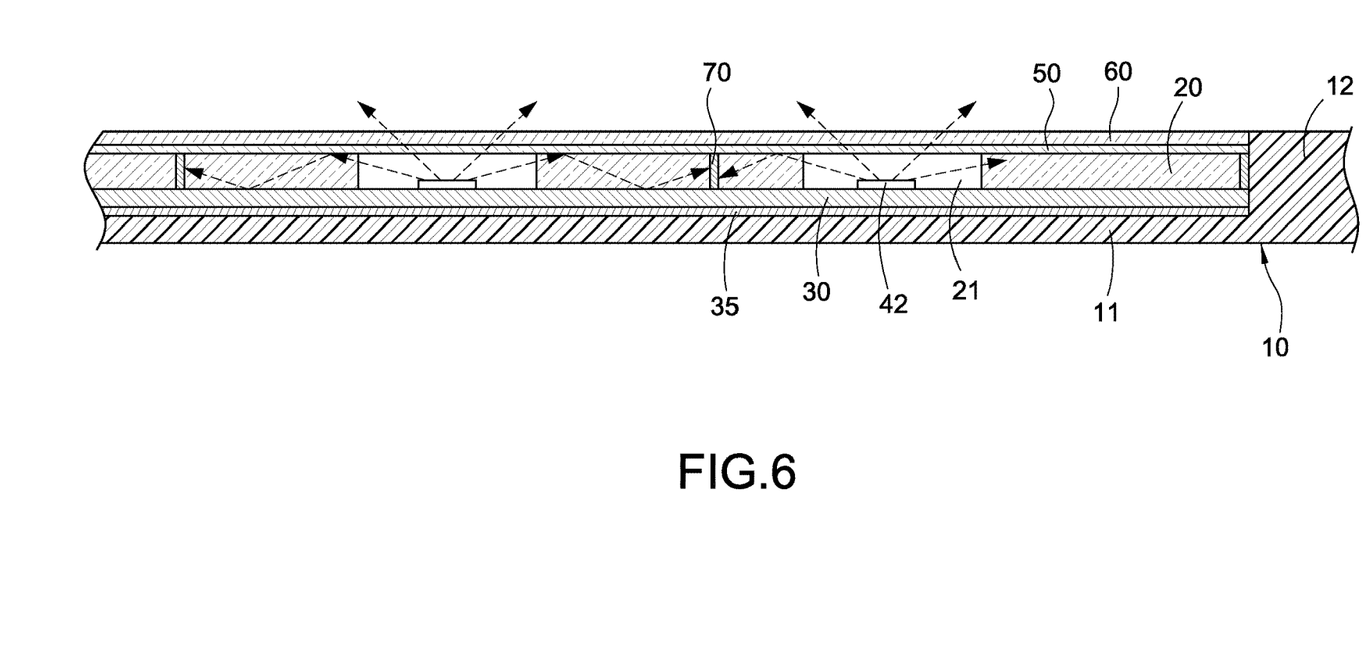
FIG. 6 is schematic view showing the mouse pad illuminating lights from another lateral side according to the present invention.

Please refer to FIG. 5 and FIG. 6, which are schematic views showing the mouse pad illuminating lights from two lateral sides according to the present invention. As shown in FIG. 5, the lateral light source module 40 is disposed at one lateral side of the light guide plate 20, lights emitted by the light emitting unit 42 enter the light guide plate 20 from the lateral side of the light guide plate 20, a part of the lights penetrates the light unifying layer 50 for emitting out from the pad member 60, and another part of the lights is reflected by the light guide plates 20 and travels along an extending direction of the light guide plates 20. Accordingly, with the light guide plates 20 and the light unifying layer 50, the lights generated by the lateral light source module 40 can evenly enter the pad member 60, so that an objective of laterally guiding lights can be achieved, and the mouse pad 1 of the present invention is provided with a unified lighting effect.

As shown in FIG. 6, what shall be addressed is that, according to this embodiment, the mouse pad 1 further includes a plurality of light shield sheets 70; the light shield sheets 70 are disposed between every two of the adjacent light guide plates 20. Substantially speaking, the light shield sheet 70 is extended from one side of the light emitting unit 42 toward the extending direction of the light guide plate 20 so as to shield the light guide plate 20 from one lateral side of the adjacent light guide plate 20.

Accordingly, with the light shield sheet 70, lights emitted by the light emitting unit 42 can be prevented from entering the adjacently-arranged light guide plate 20. As such, lights emitted by the light emitting unit 42 can be defined as an independent light source, and the lights can travel in the corresponding light guide plate 20. Accordingly, the light emitting units 42 are able to provide various lighting effects, for example a marquee, for achieving a better visual effect.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A mouse pad having multiple light guide plates, including:
   a base, including an accommodation space and an electric wire;
   a plurality of light guide plates parallelly and adjacently arranged in a coplanar manner and linearly extended in the accommodation space;
   a light reflection layer, disposed between the light guide plates and the base;
   at least one lateral light source module, disposed at one lateral side of the light guide plates, and including a flexible wire and a plurality of light emitting units, wherein the flexible wire is electrically connected to the electric wire, and the light emitting units are disposed on the flexible wire and electrically connected to the flexible wire;
   a light unifying layer, disposed on top surface of the light guide plates away from the base, and the light unifying layer extending beyond the light guide plates to cover the at least one lateral light source module, wherein the light unifying layer forms as a single piece layer covering the full top surface of the light guide plates; and a pad member, disposed on an outer surface of the light unifying layer, wherein the light emitting units are able to emit lights to the pad member through the light guide plates and the light unifying layer.

2. The mouse pad having multiple light guide plates according to claim 1, further including a plurality of light shield sheets, and the light shield sheets are disposed between every two of the adjacent light guide plates.

3. The mouse pad having multiple light guide plates according to claim 1, wherein the base includes a bottom plate and a plurality of lateral sheets, and the lateral sheets are served to surround the periphery of the bottom plate thereby defining the accommodation space.

4. The mouse pad having multiple light guide plates according to claim 1, wherein the light reflection layer is directly formed on a lateral surface of the light guide plates facing the base.

5. The mouse pad having multiple light guide plates according to claim 1, further including an anti-skid pad, and the anti-skid pad is disposed between the base and the light reflection layer.

6. The mouse pad having multiple light guide plates according to claim 1, wherein the amount of the light emitting units is corresponding to the amount of the light guide plates.

7. The mouse pad having multiple light guide plates according to claim 1, wherein one side of each light guide plate is formed with a hollow slot, the flexible wire is disposed on a bottom surface defined at one side of each light guide plate, and the light emitting unit is exposed in the hollow slot.

8. The mouse pad having multiple light guide plates according to claim 1, wherein each light guide plate has a plurality of light guide structures.

9. The mouse pad having multiple light guide plates according to claim 1, wherein there are a plurality of lateral light source modules, and two opposite sides of the light guide plate are disposed with one of the lateral light source modules.

10. The mouse pad having multiple light guide plates according to claim 1, wherein the pad member is made of a light-pervious material.

\* \* \* \* \*